(12) United States Patent
Sogawa et al.

(10) Patent No.: US 7,800,688 B2
(45) Date of Patent: Sep. 21, 2010

(54) METHOD FOR EXAMINING SHOOTING DIRECTION OF CAMERA APPARATUS, DEVICE THEREOF AND STRUCTURE FOR INSTALLING SENSOR

(75) Inventors: Yoshiyuki Sogawa, Tokyo (JP); Keiichi Murakami, Tokyo (JP); Yoshio Tozawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 264 days.

(21) Appl. No.: 11/773,191

(22) Filed: Jul. 3, 2007

(65) Prior Publication Data
US 2008/0036866 A1 Feb. 14, 2008

Related U.S. Application Data

(62) Division of application No. 09/665,950, filed on Sep. 21, 2000, now Pat. No. 7,248,287.

(30) Foreign Application Priority Data
Sep. 22, 1999 (JP) .............................. P. 11-269567

(51) Int. Cl.
*H04N 5/225* (2006.01)
(52) U.S. Cl. .................. 348/373; 348/42; 348/118; 348/148
(58) Field of Classification Search ................ 348/116, 348/118, 148, 51, 53, 373, 42
See application file for complete search history.

(56) References Cited

U.S. PATENT DOCUMENTS

| 4,609,939 A | 9/1986 | Kozawa et al. |
| 4,846,382 A | 7/1989 | Foultner et al. |
| 4,863,130 A | 9/1989 | Marks, Jr. |
| 5,159,436 A | 10/1992 | Soneira |
| 5,175,616 A | 12/1992 | Milgram et al. |

(Continued)

FOREIGN PATENT DOCUMENTS

DE 3518966 A1 2/1986

(Continued)

OTHER PUBLICATIONS

European Search Report for EP 10 15 1778 dated Apr. 9, 2010.

*Primary Examiner*—Gevell Selby
(74) *Attorney, Agent, or Firm*—Smith, Gambrell & Russell, llp

(57) ABSTRACT

In a test method in which an image photographed by a camera apparatus 1 attached to a body of a vehicle is displayed on a display device 17 and an examiner examines compliance or non-compliance of the shooting direction of the camera apparatus 1 by comparing the position of a reference pattern and the position of a judgment pattern on the displayed photographed image, the photographed image is obtained at first by photographing with the camera apparatus 1 a test chart which is placed at a predefined position ahead of the vehicle with the reference pattern drawn on the test chart. Next, the judgment pattern is set at a specific position on the photographed image. Then, the photographed image on which the judgment pattern has been set is displayed on the display device 17.

9 Claims, 16 Drawing Sheets

U.S. PATENT DOCUMENTS

| | | |
|---|---|---|
| 5,246,193 A | 9/1993 | Faidley |
| 5,355,163 A | 10/1994 | Tomitaka |
| 5,424,952 A * | 6/1995 | Asayama .................... 348/139 |
| 5,768,443 A | 6/1998 | Michael et al. |
| 5,850,254 A | 12/1998 | Takano et al. |
| 5,859,254 A * | 1/1999 | Rayle et al. ................ 546/316 |
| 5,915,033 A | 6/1999 | Tanigawa et al. |
| 5,935,808 A * | 8/1999 | Hirschberg et al. .......... 435/67 |
| 6,020,919 A | 2/2000 | Fujii et al. |
| 6,116,485 A * | 9/2000 | Watkins ..................... 396/419 |
| 6,222,447 B1 | 4/2001 | Schofield et al. |
| 6,373,518 B1 | 4/2002 | Sogawa |
| 6,377,701 B1 | 4/2002 | Ohki |
| 6,385,334 B1 | 5/2002 | Saneyoshi et al. |
| 6,462,777 B1 | 10/2002 | Hamaguri |
| 6,785,403 B1 | 8/2004 | Murakami et al. |
| 6,811,330 B1 * | 11/2004 | Tozawa ....................... 348/373 |
| 2003/0057339 A1 * | 3/2003 | Watkins .................... 248/274.1 |

FOREIGN PATENT DOCUMENTS

| | | |
|---|---|---|
| DE | 19800354 A1 | 7/1998 |
| EP | 0691599 A2 | 1/1996 |
| JP | 8-276787 | 10/1996 |
| JP | 10-104765 | 4/1998 |
| JP | 11-78716 | 3/1999 |
| JP | 11 78717 | 3/1999 |
| WO | WO 99/10202 | 3/1999 |
| WO | WO 99/43242 | 9/1999 |

* cited by examiner

METHOD FOR EXAMINING SHOOTING DIRECTION OF CAMERA APPARATUS, DEVICE THEREOF AND STRUCTURE FOR INSTALLING SENSOR

BACKGROUND OF THE INVENTION

1. Field of the Invention

The present invention relates to a method and a system for examining the shooting direction of a camera apparatus mounted on a vehicle like a automobile and to a structure for mounting an onboard camera apparatus using a mounting plate.

2. Description of the Related Art

Much attention is given in recent years to an outside view monitoring system using a single-lens camera or a stereo camera apparatus as a preview sensor. This kind of monitoring system photographs a forward view of own vehicle by an onboard camera apparatus attached to the vehicle and recognizes traffic conditions ahead of own vehicle based on photographed images using image-recognition technology (also using the principle of triangulation in a stereoscopic method). Then, when the need arises, the monitoring system calls a driver's attention or performs vehicle behavior control operation such as deceleration by a downshift.

When this kind of monitoring camera apparatus is fitted to a vehicle body, a high degree of accuracy is needed with respect to its mounting position. This is because an error in the mounting position of the camera apparatus results in a deviation of the shooting direction of the camera apparatus, eventually causing a reduction in the reliability of monitoring control operation. Especially when a stereo camera apparatus is used as an onboard camera apparatus, an extremely high degree of accuracy is needed with respect to its shooting direction. This is because a deviation of the shooting direction directly affects a calculated distance, since the distance is calculated from parallaxes between a pair of photographed images in the stereoscopic method. In actuality however, variations occur in the shooting direction of individual onboard camera apparatus due to distortion of vehicle bodies themselves or limitations in the accuracy of camera installation. Thus, when the shooting direction deviates, a technique for making a fine adjustment is used to make up for the deviation of the shooting direction equivalently by applying an image transformation, such as affine transformation, to the photographed images.

A finely adjustable range achieved by such an image transformation is not so wide, however. Therefore, when the shooting direction of an onboard camera apparatus greatly deviates from a proper range (i.e., a range for which fine adjustment by the affine transformation, for example, is possible), it becomes difficult to adjust to make up for the deviation by an image transformation. It is therefore necessary to examine whether the shooting direction of each camera apparatus installed falls within the proper range in a test process performed upon completion of its installation. Samples which have been judged to be deviating from the proper range need to be subjected to mechanical readjustment, such as re-installation of the camera apparatus, so that their shooting directions would fall within the proper range. For this reason, it is strongly desired to establish a test method which makes it possible to achieve improved efficiency and automation of such testing.

SUMMARY OF THE INVENTION

This invention has been made in consideration of the aforementioned circumstances. Accordingly, it is an object of the invention to provide a test method which makes it possible to efficiently make a judgment on compliance or non-compliance when testing the shooting direction of an onboard camera apparatus.

It is another object of the invention to achieve improved efficiency of readjustment by providing a worker with information useful for carrying out the readjustment when the shooting direction has been judged to be deviating.

To solve the aforementioned problems, a present invention according to a first aspect provides a test method for examining the shooting direction of an onboard camera apparatus, in which an image photographed by the camera apparatus attached to a body of a vehicle is displayed on a display device and an examiner examines compliance or non-compliance of the shooting direction of the camera apparatus by comparing the position of a reference pattern and the position of a judgment pattern on the displayed photographed image, the test method for examining the shooting direction of the camera apparatus comprising a step of obtaining the photographed image by photographing with the camera apparatus a test chart which is placed at a predefined position ahead of the vehicle with the reference pattern drawn on the test chart, a step of setting the judgment pattern at a specific position on the photographed image, and a step of displaying the photographed image on which the judgment pattern has been set on the display device.

Here, it is preferable that the aforementioned setting step be a step in which the judgment pattern having at least one judgment reference line extending in a horizontal direction and at least one judgment reference line extending in a vertical direction is set on the photographed image.

A present invention according to a second aspect provides a test method for examining the shooting direction of an onboard camera apparatus attached to a body of a vehicle, the test method for examining the shooting direction of the camera apparatus comprising a step of obtaining a photographed image by photographing with the camera apparatus a test chart which is placed at a predefined position ahead of the vehicle with a reference pattern drawn on the test chart, a step of determining the position of the reference pattern on the photographed image, and a step of making a judgment on compliance or non-compliance of the shooting direction of the camera apparatus based on a relationship between the position of the reference pattern determined and a proper range which defines a range appropriate for the shooting direction of the camera apparatus.

Here, the aforementioned determining step may include a step of evaluating the correlation of each of specific regions in the photographed image with a previously prepared specific brightness characteristics pattern, and a step of specifying the position of one of the regions which has been judged to have the greatest correlation as the position of the reference pattern. This brightness characteristics pattern has the same brightness characteristics as the reference pattern shown on the photographed image.

Also, it is preferable that the step of determining the position of the reference pattern include a step of evaluating the correlation with the brightness characteristics pattern by searching through a specific search range within the photographed image. The setting position of this search range is determined based on the position of the reference pattern shown on the photographed image under conditions where the camera apparatus is properly mounted. The area of the search range is set in consideration of a deviation of the shooting direction of the camera apparatus which may be caused by an error in the mounting position of the camera apparatus.

In the aforementioned first and second aspect of the present inventions, it is preferable that the reference pattern be typically a crisscross pattern or a rectangular pattern.

Also, in the second aspect of the present invention, there may be further provided a step of notifying an examiner of information showing current mounting conditions of the camera apparatus or information concerning adjustment of the mounting of the camera apparatus according to the amount of deviation of the reference pattern if the reference pattern deviates from the proper range.

It is preferable that the second aspect of the present invention be used in a test method for examining the shooting direction of the onboard camera apparatus in which the camera apparatus is attached to the vehicle body via a replaceable mounting member and the shooting direction of the camera apparatus is determined by the shape of the mounting member. In this case, it is preferable that the aforementioned notifying step be a step in which a mounting member having such a shape that minimizes the amount of deviation of the reference pattern is selected from a plurality of previously prepared mounting members having different shapes and the examiner is notified of the selected mounting member.

A present invention according to a third aspect is a test system for examining the shooting direction of an onboard camera apparatus, the test system comprising the camera apparatus which is attached to a body of a vehicle and outputs a photographed image by photographing a situation ahead of the vehicle, processing means which superimposes a specific judgment pattern on the photographed image at its specific position when it is requested to perform a superimposition operation on the photographed image, and display means which displays the photographed image. This camera photographs a test chart which is placed at a predefined position ahead of the vehicle with a specific reference pattern drawn on the test chart during a test. Also, the processing means performs the superimposition operation on the photographed image during the test. Further, the display device displays the position of the reference pattern on the photographed image and the position of the judgment pattern in a manner that they can be compared with each other during the test.

Here, the processing means superimposes the judgment pattern having at least one judgment reference line extending in a horizontal direction and at least one judgment reference line extending in a vertical direction on the photographed image.

A present invention according to a fourth aspect is a test system for examining the shooting direction of an onboard camera apparatus attached to a body of a vehicle, the test system comprising the camera apparatus which is attached to the vehicle body and outputs a photographed image by photographing a situation ahead of the vehicle, and test means which examines the shooting direction of the camera apparatus based on a photographed image obtained by photographing with the camera apparatus a test chart which is placed at a predefined position ahead of the vehicle with a specific reference pattern drawn on the test chart during a test. Here, the test means determines the position of the reference pattern on the photographed image. Then, the test means judges that the shooting direction of the camera apparatus is proper if the position of the reference pattern thus determined falls within a proper range which defines a range appropriate for the shooting direction of the camera apparatus, and the test means judges that the shooting direction of the camera apparatus is improper if the position of the reference pattern falls outside the proper range.

It is preferable that the test means evaluate the correlation of each of specific regions in the photographed image with a previously prepared specific brightness characteristics pattern and specify the position of one of the regions which has been judged to have the greatest correlation as the position of the reference pattern. This brightness characteristics pattern has the same brightness characteristics as the reference pattern shown on the photographed image.

Also, the test means may evaluate the correlation of each of specific regions existing in a specific search range within the photographed image with the brightness characteristics pattern. The setting position of this search range is determined based on the position of the reference pattern shown on the photographed image under conditions where the camera apparatus is properly mounted. The area of the search range is set in consideration of a deviation of the shooting direction of the camera apparatus which may be caused by an error in the mounting position of the camera apparatus.

In the third or fourth aspect of the present invention, it is preferable that the reference pattern be a crisscross pattern or a rectangular pattern.

With regards the fourth aspect of the present invention, in a structure in which the camera apparatus is attached to the vehicle body via a mounting member, the test means may output instructional information concerning adjustment of the mounting of the camera apparatus according to the amount of deviation of the reference pattern relative to the proper range if the position of the reference pattern deviates from the proper range.

The member to be used as this mounting member may be a replaceable member which is independent of the camera apparatus wherein the shooting direction of the camera apparatus is determined by the shape of the mounting member. In this case, the test means selects a mounting member having such a shape that minimizes the amount of deviation of the reference pattern from a plurality of previously prepared mounting members having different shapes, and outputs the instructional information concerning the selected mounting member.

The member to be used as this mounting member may be a plate-like member having a tapered shape in cross section along a longitudinal direction of the vehicle wherein the vertical component of the shooting direction of the camera apparatus is determined by the tapered shape.

A present invention according to a fifth aspect provides a structure for mounting an onboard sensor, the structure for mounting the onboard sensor comprising a sensor assembly in which a sensor for photographing traffic conditions ahead of a vehicle is assembled, and a mounting member formed independently of the sensor assembly, wherein the sensor assembly is attached to a vehicle body with the mounting member placed in between, and a monitoring direction of the sensor is determined based on the shape of the mounting member.

An invention according to a sixth aspect provides a structure for mounting an onboard sensor, the structure for mounting the onboard sensor comprising a mounting member, and a sensor assembly which is attached to a vehicle body with the mounting member placed in between and with a sensor for photographing traffic conditions ahead of the vehicle assembled into the sensor assembly, wherein the mounting member can be replaced by removing the sensor assembly, and a monitoring direction of the sensor is determined based on the shape of the mounting member.

In the fifth or sixth aspect of the present invention, it is preferable that the structure be such that the mounting member is a plate-like member and the monitoring direction of the sensor is determined by a state of the thickness of the mounting member.

Also, it is preferable that the structure be such that the mounting member has a tapered shape in cross section along the longitudinal direction of the vehicle, and the vertical component of the monitoring direction of the sensor is determined by the tapered shape.

Further, it is preferable that the monitoring direction of the sensor can be adjusted by replacing the mounting member with another mounting member having a different shape.

On the other hand, it is preferable that a contact surface between the mounting member and the sensor assembly do not match the horizontal plane under conditions where the sensor is attached to the vehicle body.

On the other hand, a fixing member for fixing the sensor assembly to the vehicle body is further provided in the fifth or sixth aspect of the present invention. In this case, it is preferable that the mounting member become a member independent of the sensor assembly if the fixing member is removed under conditions where the sensor assembly is fixed to the vehicle body.

Also in the fifth and sixth aspect of the present inventions, if the mounting member can be replaced with another mounting member having a slightly different shape, it is preferable that each mounting member be marked with an identification mark indicating features of its shape. In this case, it is preferable that the location where the identification mark is placed be an externally unascertainable location under conditions where the sensor is attached to the vehicle body.

It is preferable that the camera apparatus of the aforementioned first to fourth inventions be a stereo camera apparatus. Also in the first and third aspect of the present inventions, it is preferable that the photographed image on which the judgment pattern has been set be displayed on a navigation display provided in a navigation device.

DETAILED DESCRIPTION OF THE PREFERRED EMBODIMENT

First Embodiment

Figure 1:
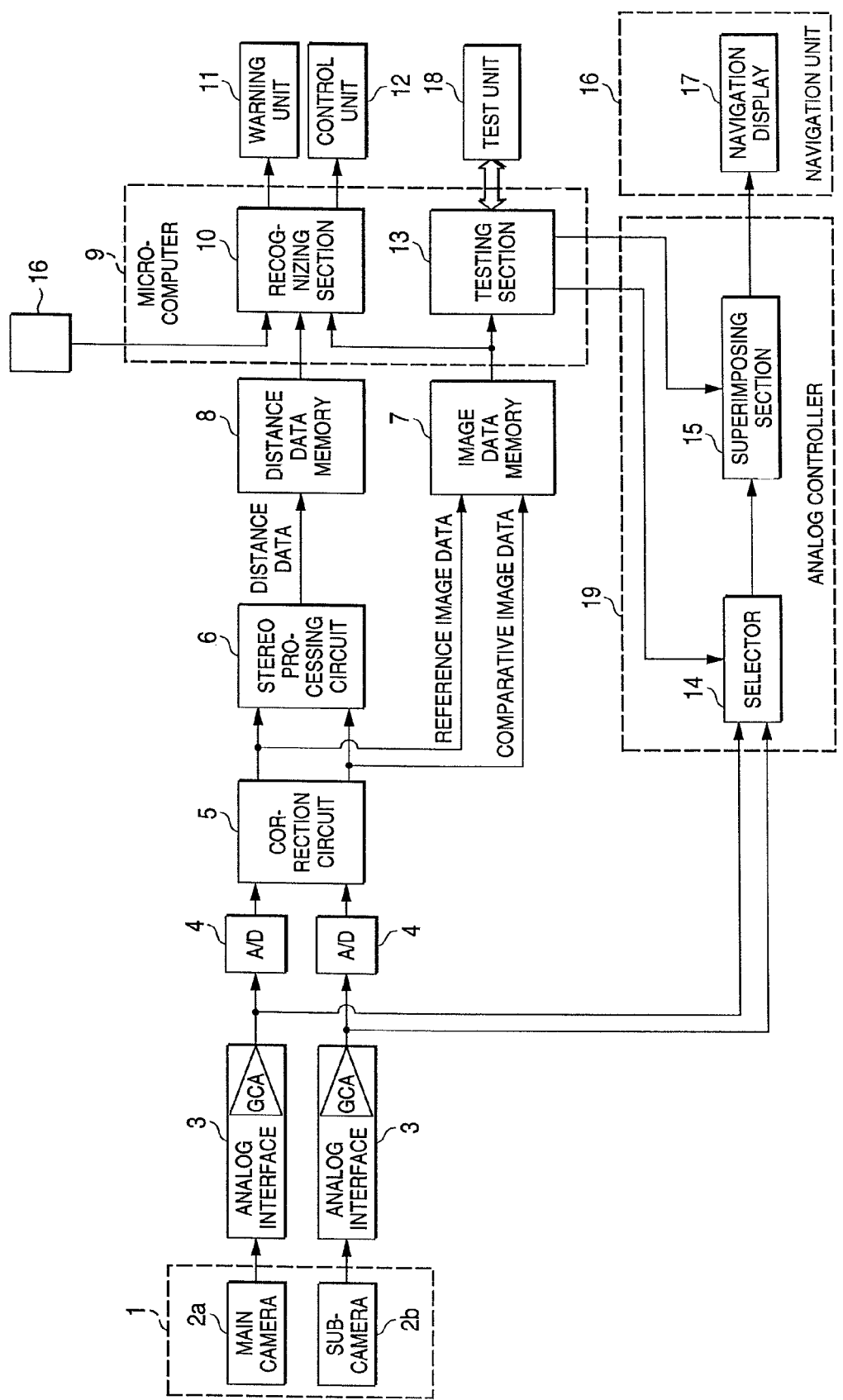
FIG. 1 is a block diagram of a stereoscopic outside view monitoring system according to a first embodiment.
Figure 17:
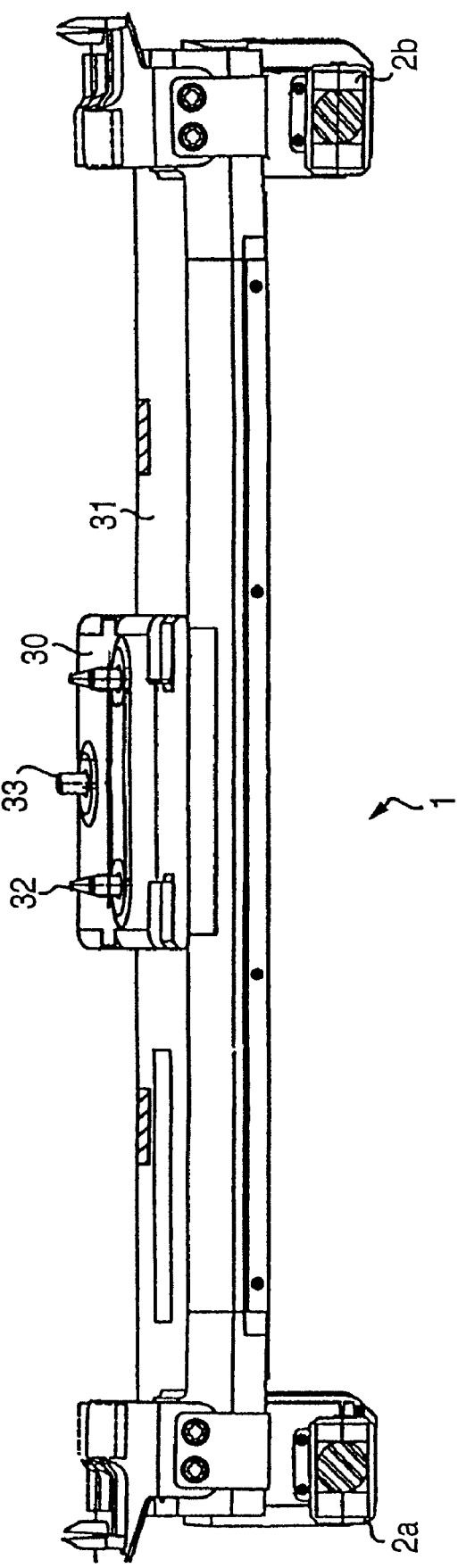
FIG. 17 is a front view of the stereo camera apparatus.
Figure 18:
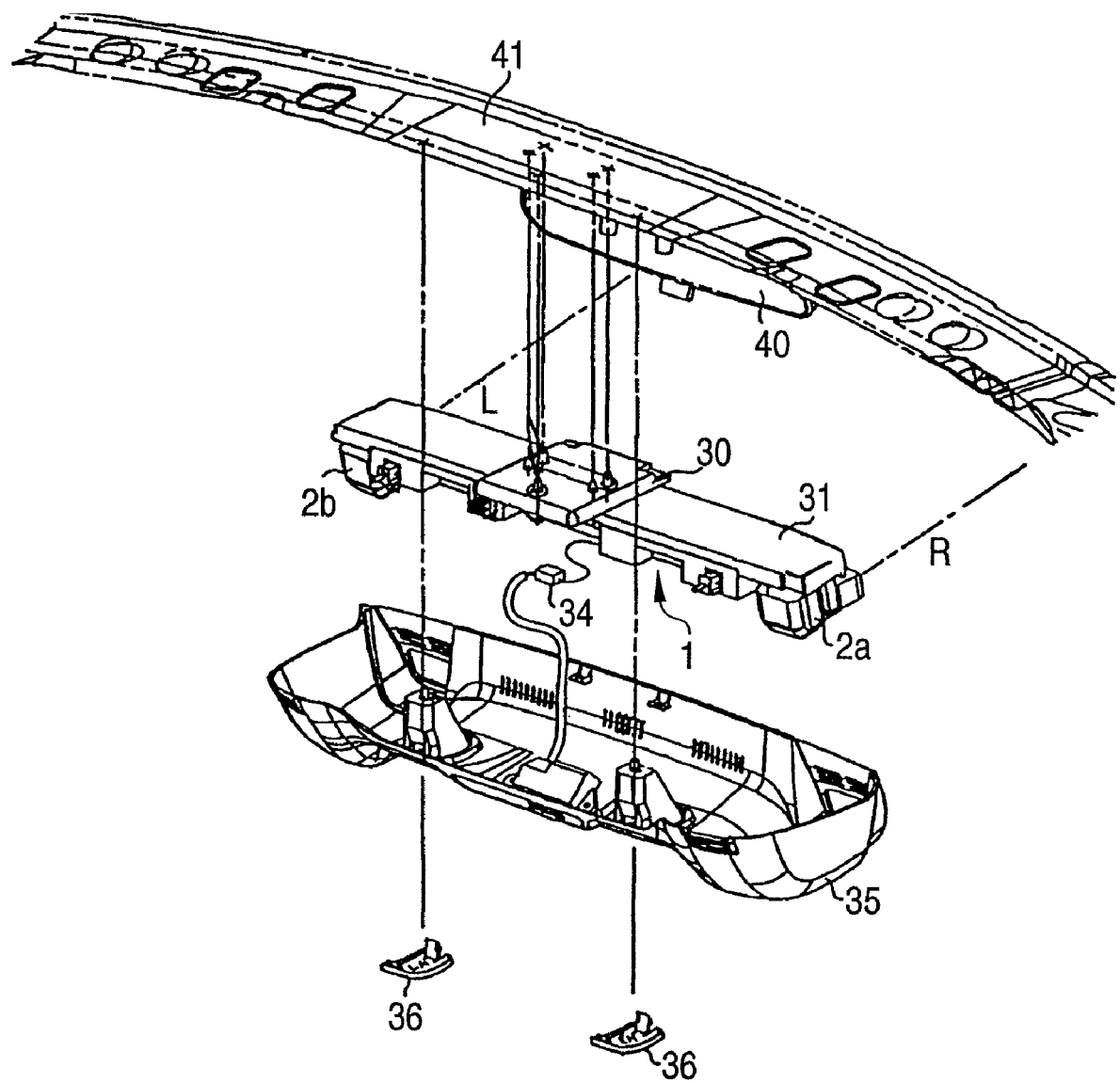
FIG. 18 is an overall exploded perspective view of a structure for mounting the stereo camera apparatus.
Figure 19:
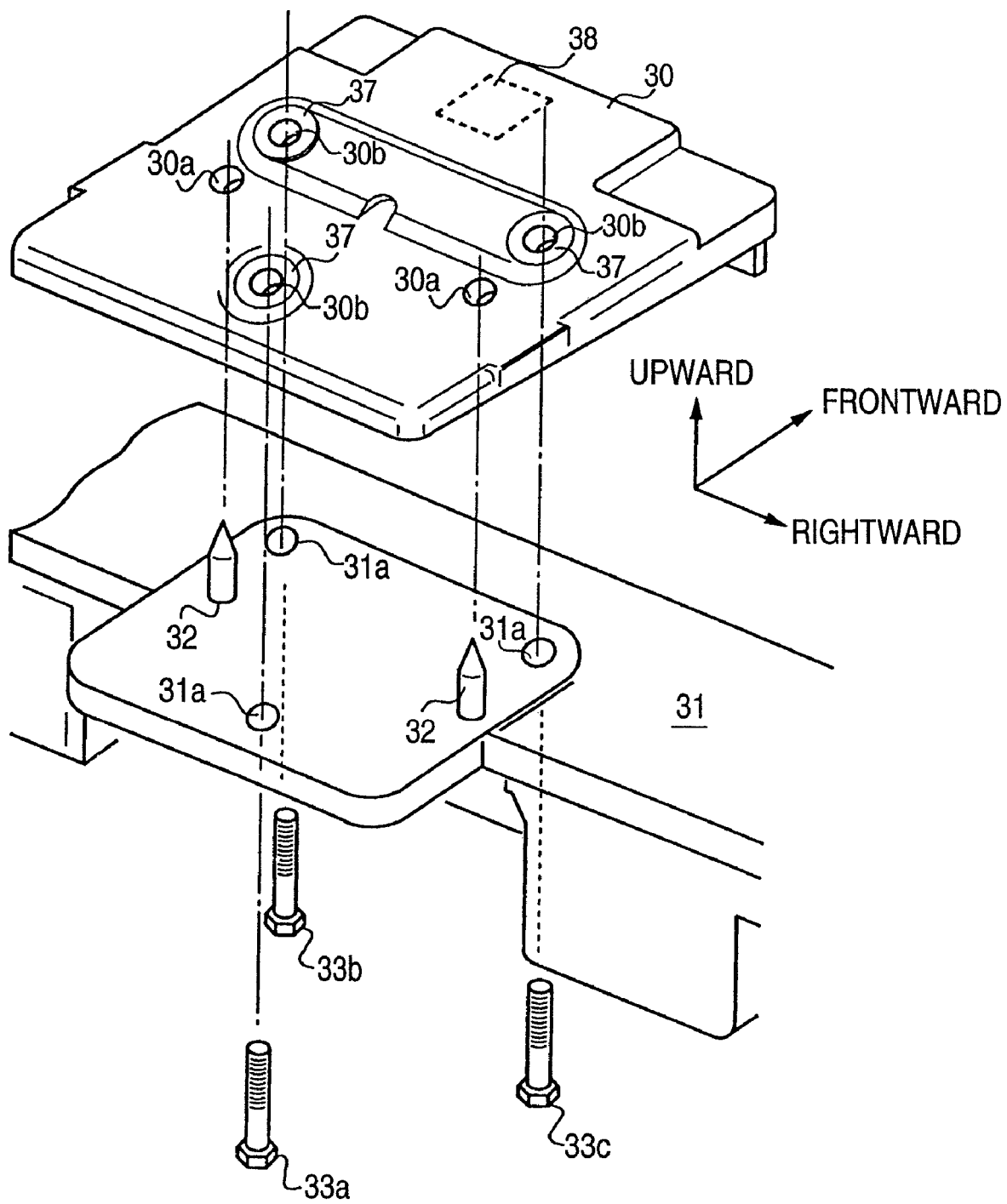
FIG. 19 is an exploded perspective view showing a principal portion for mounting the stereo camera apparatus.

FIG. 1 is a block diagram of a stereoscopic outside view monitoring system employing a stereo camera apparatus 1 as an example of an onboard camera apparatus. The stereo camera apparatus 1 which takes pictures of traffic conditions ahead of a vehicle is formed of a pair of cameras 2a, 2b placed on a baseline of a specific length. Since installation of the stereo camera apparatus 1 on a vehicle body is concerned with a later-described method of testing shooting directions, a structure for mounting the stereo camera apparatus 1 is generally described in the following referring to FIGS. 17 to 19. FIG. 17 is a front view of the stereo camera apparatus 1 and FIG. 18 is an overall exploded perspective view of the structure for mounting the stereo camera apparatus 1. FIG. 19 is an exploded perspective view showing principal part of a portion for mounting the stereo camera apparatus 1.

A chassis 31 of the stereo camera apparatus 1 is made of high-rigidity aluminum alloy so that it would not deform due to the weight of the cameras 2a, 2b or due to acceleration or deceleration in driving situations. The main camera 2a is mounted at a terminal part of the chassis 31 on its right side as viewed along a forward direction. A reference image is obtained from an output signal from an image sensor, such as a charge-coupled device (CCD), incorporated in this camera 2a. On the other hand, the sub-camera 2b is mounted at a left-hand terminal part of the chassis 31, and a comparative image is obtained from an output signal from this camera 2b. Three mounting holes (mounting holes for bolt 33) passing from a top surface to a bottom surface of the chassis 31 are formed in its central part. Also, two locator pins 32 are formed in the central part of the chassis 31 for positioning the stereo camera apparatus 1 when mounting it on the vehicle body (front rail 41).

Figure 15:
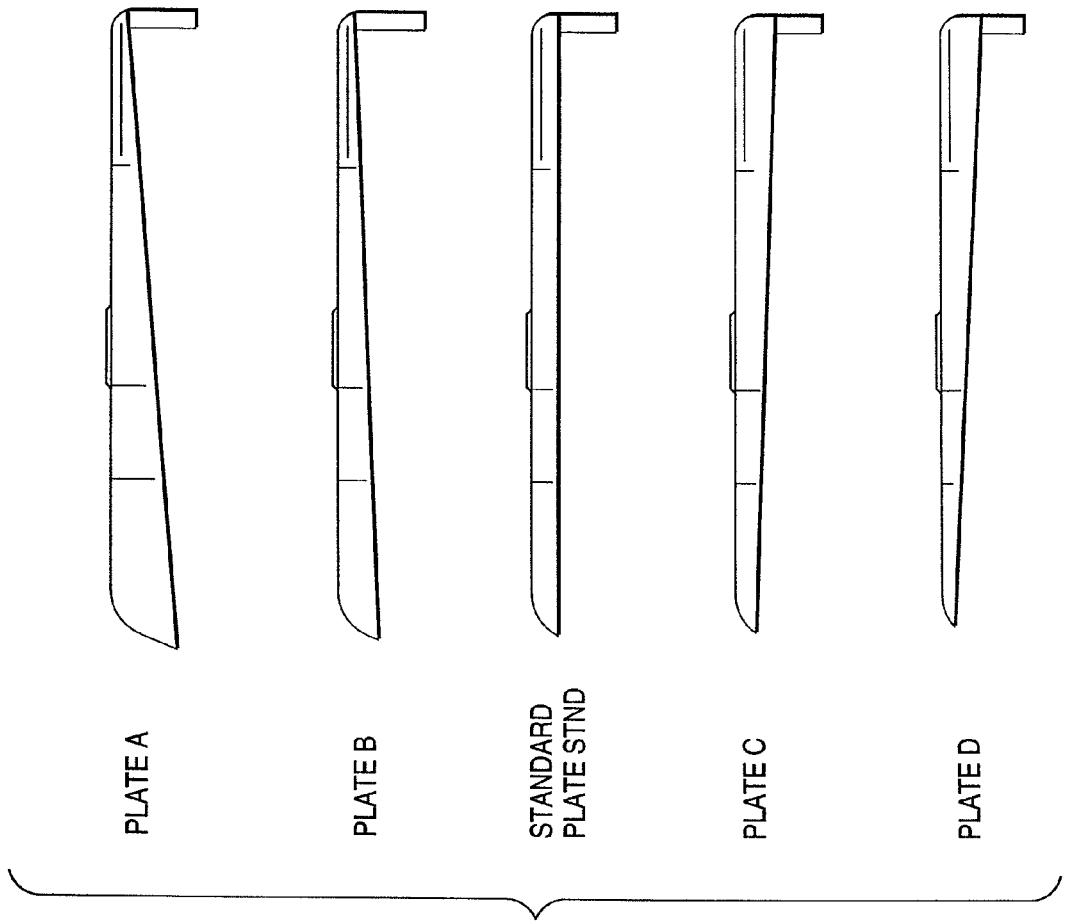
FIG. 15 is a diagram showing shapes in side view of plates.

The stereo camera apparatus 1 (stereo camera assembly 1 including both cameras 2a, 2b assembled together here) is attached to the vehicle body (front rail 41 in this embodiment) by using a mounting plate 30 as a mounting member in the vicinity of a rear-view mirror 40. In this mounting condition, the mounting plate 30 having a specific thickness exists between the stereo camera assembly 1 and the front rail 41. When installing the stereo camera assembly 1, the locator pins 32 formed on the chassis 31 are inserted into positioning through holes 30a in the mounting plate 30 at first. The individual through holes 30a are formed on bosses 37 formed on a top surface of the mounting plate 30 via a predetermined height. An identification mark for identifying the mounting plate 30 is marked in an identification mark display area 38 illustrated (an area enclosed by broken lines on the top surface of the mounting plate 30 as shown in FIG. 19). While a detailed description will be given later, this mounting plate 30 can be replaced by one of plates A-D having slightly differing tapered shapes in cross section along the vehicle's length as shown in FIG. 15. Since the individual plates A-D, STND are extremely similar to each other in their external appearance, it is likely that a worker would mix them up unless there is some sort of identification mark. Under these circumstances, the identification mark corresponding to each plate is marked to enable the worker to easily recognize characteristic features of the individual plates. The identification mark may be any marking, such as letters ("A" to "D" and "STND" in the example of FIG. 15), figures, symbols or a specific number of dots. Any method may be used to form the identification mark. For example, it may be printed directly on the surface of the mounting plate 30 or formed by producing the plate 30 by extrusion process.

In this condition, the positions of three mounting holes 31a formed in the chassis 31 match the positions of three mounting holes 30b formed in the mounting plate 30. Next, the locator pins 32 are inserted into holes formed in the front rail 41 and, while maintaining this condition, three bolts 33a, 33b, 33c are passed through the mounting holes 30b, 31a and fixed to the front rail 41 by means of bolts. Then, after connecting a switch connector 34 to the stereo camera assembly 1, an outer cover 35 is fixed to the front rail 41. Finally, external appearance is finished by fitting blind plates 36 in bolt fitting parts of the outer cover 35, whereby a procedure for installation work is completed. Although the bolts 33 are described as an example of fixing members here, it is possible to select other known fixing members (of which removal is relatively easy) including screws, for example. The stereo camera assembly 1 is fixed to the front rail 41 by means of the bolts 33 whose removal is relatively easy as seen above. Therefore, when removing the stereo camera assembly 1 following the above procedure in a reverse order, it is possible to handle the mounting plate 30 as a member independent of the stereo camera assembly 1 by just removing the bolts 33. This is a great advantage in replacement work of the mounting plate 30.

In a condition where the stereo camera apparatus 1 has been installed, the identification mark display area 38 is concealed because it becomes a contact surface with the front rail 41 (or it is situated in a position which can not been seen from outside). Therefore, even if the identification mark is marked in a considerably large size to allow easy recognition by the worker, it is not externally recognizable, so that it will not produce any problem with respect to external appearance.

Here, the mounting plate 30 is a member formed separately from the stereo camera assembly 1 (or the chassis 31), so that it can be handled independently of the assembly 1 under conditions where the stereo camera assembly 1 is removed. As already described, the stereo camera assembly 1 is attached to the front rail 41 with the mounting plate 30 sandwiched in between. A reason why a mounting member separate from a camera body is used at the time of installation is to enable coarse adjustment of shooting directions of the stereo camera apparatus 1 by replacing the mounting member. This point is where the present invention differs significantly from conventional techniques in which a stay combined integrally with a camera assembly is directly attached to a vehicle body. Vertical components of the shooting directions (that is, lines of sight L, R of the cameras shown in FIG. 18) of the stereo camera apparatus 1 are determined by the cross-sectional shape of the plate 30 along the vehicle's longitudinal direction. Specifically, when the thickness of the plate 30 gradually varies (or if it has a tapered shape), the greater the thickness of a front part (right side) compared to a rear part (left side in FIG. 15) as shown by the plate D of FIG. 15, the more the stereo camera apparatus 1 is directed downward (toward the ground). Contrary to this, when a tapered mounting plate 30 whose thickness is larger at the rear part than at the front part is used, the greater the thickness of the rear part, the more the stereo camera apparatus 1 is directed upward as shown by the plate A of FIG. 15.

It is possible to handle the mounting plate 30 independently of the stereo camera assembly 1 by removing the assembly 1 as described above. Therefore, it is possible to adjust the shooting directions of the stereo camera apparatus 1 by replacing the plate 30 with another one having a different shape. As an example, the stereo camera assembly 1 is attached to the vehicle body commonly using a standard plate having a specific shape in an installation process of the stereo camera apparatus 1. Then, if it is judged that the shooting directions of the stereo camera apparatus 1 significantly deviate in a test process that follows the installation process, the standard plate is replaced by a replacement plate. There are prepared a plurality of replacement plates whose shapes slightly vary (e.g., the angle of their taper slightly varies). Variations in the shooting directions caused by distortion of the vehicle body or machining accuracy can be adjusted so that they would fall within a proper range (a range in which fine adjustment by image transformation is possible) by using a plate having a proper shape.

Analog signals output from the stereo camera apparatus 1 attached to the vehicle body are processed as follows in various circuit elements in succeeding stages. Under conditions where the pair of the cameras 2a, 2b is synchronized, the analog image signals output from the individual cameras 2a, 2b are adjusted in analog interfaces 3 such that the analog image signals match input ranges of circuits in the succeeding stages. Gain control amplifiers (GCA) contained in these analog interfaces 3 adjusts brightness balance of the pair of the analog image signals. The analog image signals adjusted in the analog interfaces 3 are output to an analog controller 19 and to respective analog-to-digital (A/D) converters 4. Photographed images digitized by the A/D converters 4 are subjected to affine transformation in a correction circuit 5 to finely adjust the photographed images. Reference image data and comparative image data which have been subjected to the aforementioned image processing operation are stored in an image data memory 7. Also, a stereo processing circuit 6 calculates parallaxes for the photographed images of one frame (one page) based on the reference image data and the comparative image data. The parallaxes are is calculated for specific pixel blocks using a known stereo matching method. The parallaxes calculated for one frame are stored as distance data in a distance data memory 8.

A microcomputer 9 (a recognizing section 10 which is a relevant functional block of the microcomputer 9 as viewed from a functional point of view) recognizes road shapes (white lines) and each three-dimensional object (running vehicle) ahead of own vehicle, for example. Their recognition is made based on the image data stored in the image data memory 7, the distance data stored in the distance data memory 8, and navigation information fed from a navigation unit 16. When the recognizing section 10 judges that it is necessary to give a warning based on the results of such recognition and behavioral status of own vehicle, it activates a warning unit 11, such as a monitor or a speaker, to thereby draw a driver's attention. Also, the microcomputer 9 performs such vehicle control operation as a downshift of an AT (automatic transmission), a reduction in engine output, or activation of brakes by controlling a control unit 12 as the need arises.

A test unit 18 is an external device which is connected only during a product testing process. When the test unit 18 is connected to the microcomputer 9 and start of testing is requested by the test unit 18, the microcomputer 9 (a testing section 13 which is a relevant functional block of the microcomputer 9 as viewed from a functional point of view) carries out a preprogrammed examination routine. The testing section 13 outputs specific command signals to the analog controller 19 as the need arises. The analog controller 19 processes the analog signals to enable testing by visual inspection by an examiner. Specifically, a selector 14 in the analog controller 19 selects only an analog reference image signal output from one of the analog interfaces 3 according to an instruction from the testing section 13 and outputs it to a superimposing section 15. The superimposing section 15 performs a superimposition operation on the analog reference image signal according to an instruction from the testing section 13 to superimpose later-described judgment reference lines L on the reference image. The reference image is presented on a navigation display 17 provided in the navigation unit 16 based on the analog signal to which the aforementioned operations have been applied. The examiner makes a judgment on compliance or non-compliance of the shooting directions of a sample by evaluating the on-screen photographed images by visual inspection.

Figure 3:
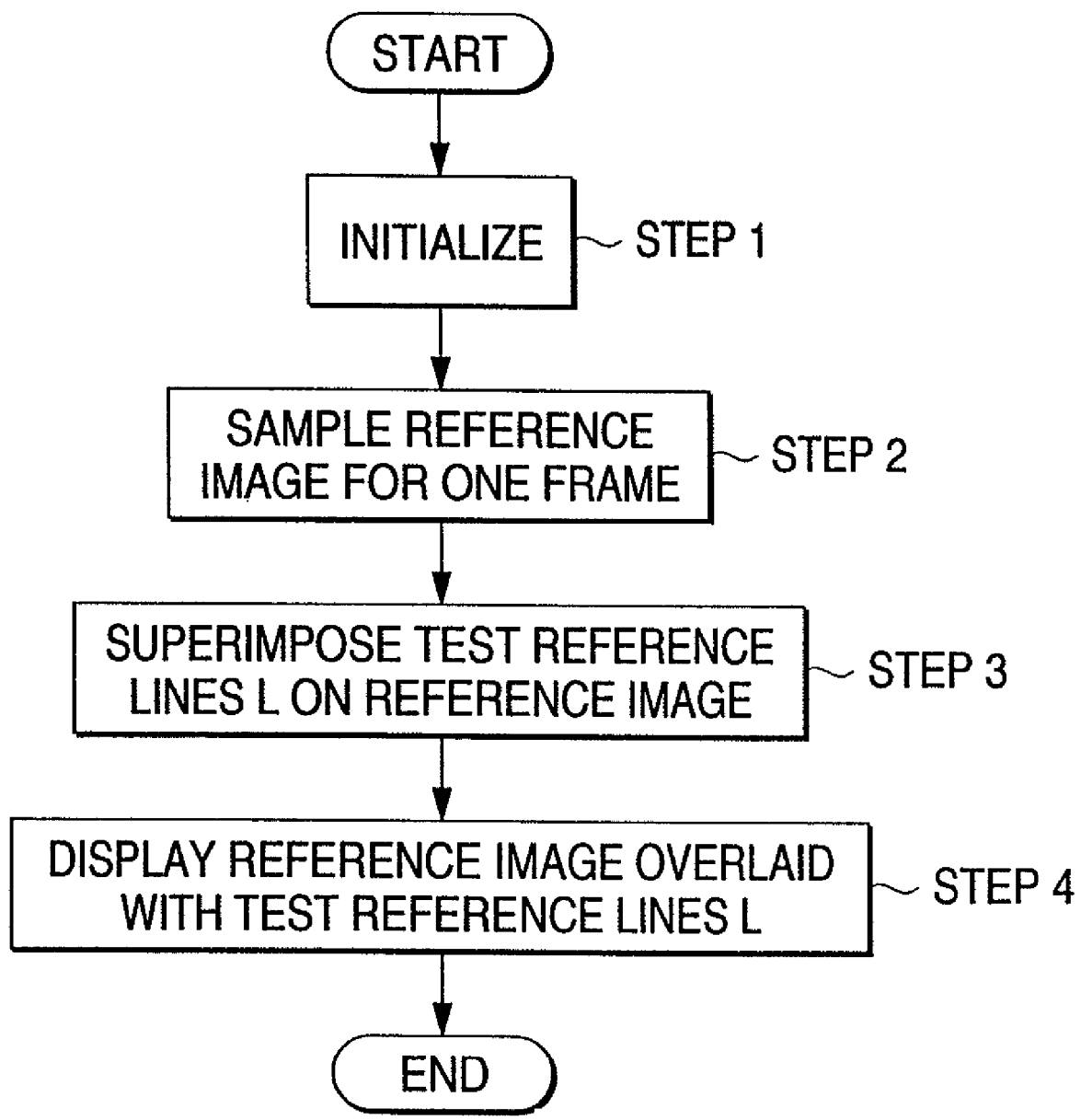
FIG. 3 is a flowchart showing a procedure for examining shooting directions of a stereo camera apparatus according to the first embodiment.
Figure 7:
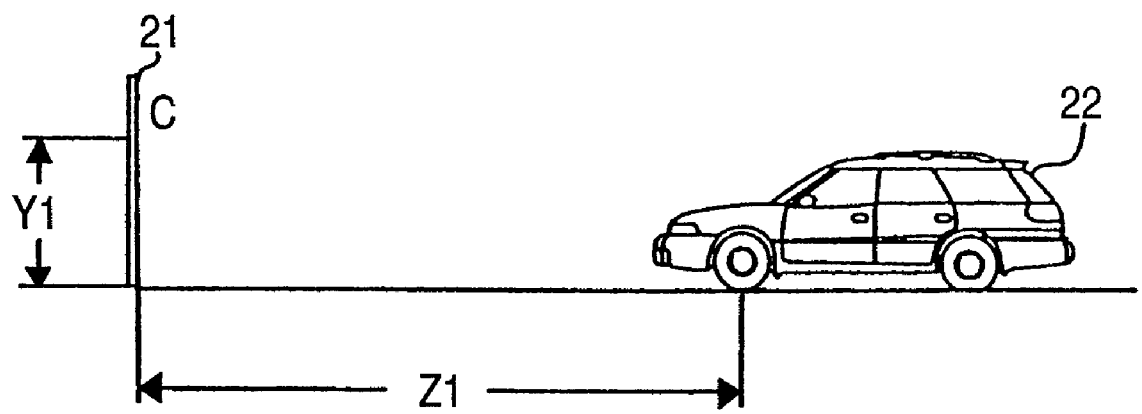
FIG. 7 is a diagram showing a relationship between the position where a test chart is placed and a vehicle.
Figure 7:
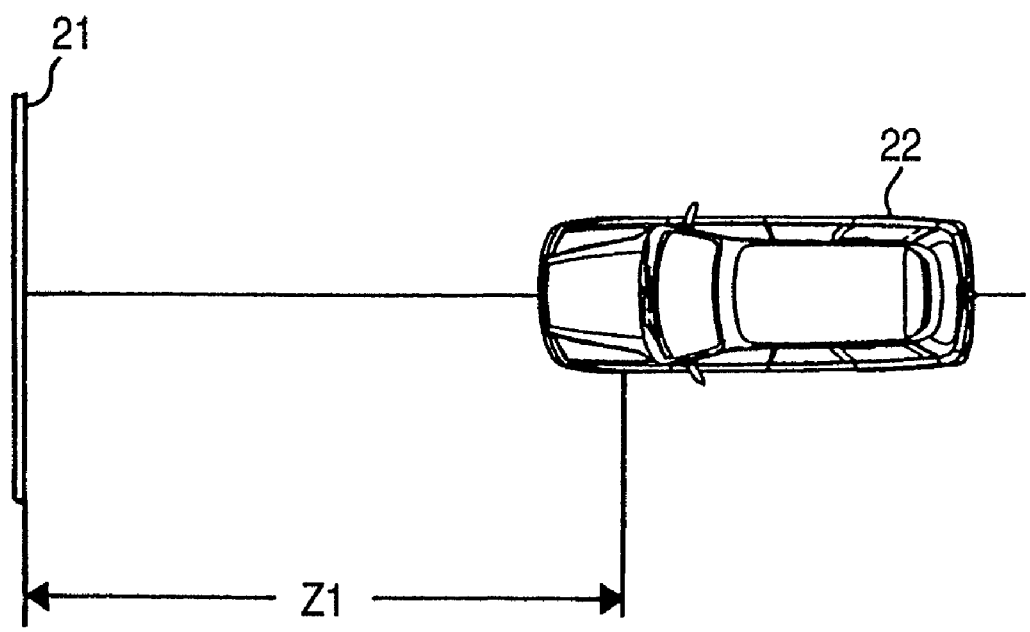
Figure 8:
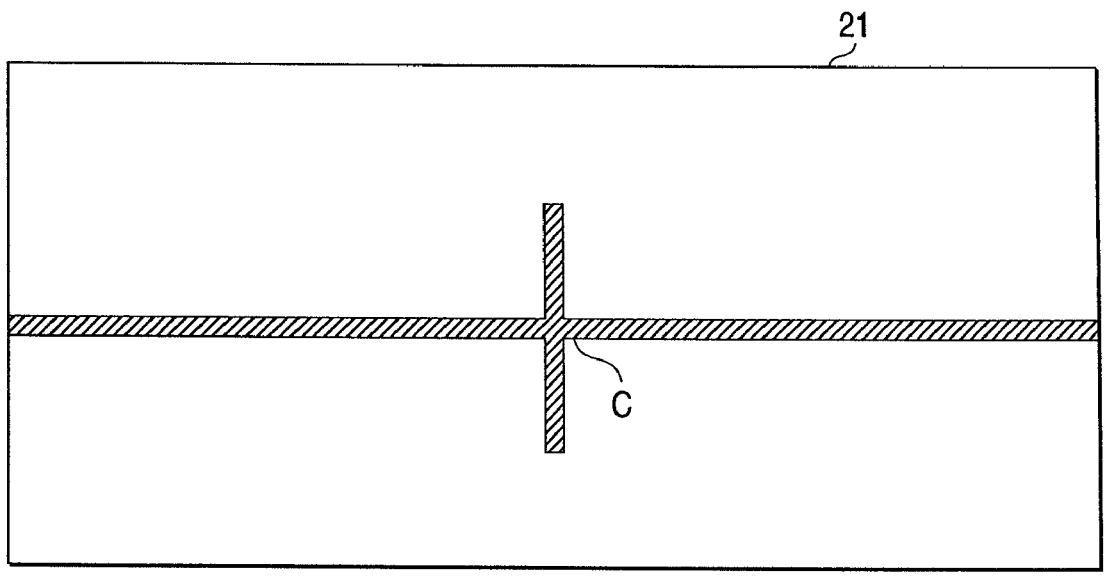
FIG. 8 is a diagram showing an example of the test chart.

FIG. 3 is a flowchart showing a procedure for examining the shooting directions of the stereo camera apparatus according to the first embodiment. First, the examiner places a test chart carrying a specific pattern at a specified position ahead of the vehicle before entering a command to start an examination routine. FIG. 7 is a diagram showing a relationship between the position where the test chart is placed and the vehicle to be tested, and FIG. 8 is a diagram showing an example of the test chart 21 used in this examination. A crisscross pattern is drawn on a white surface of the test chart 21 with black lines having a specific width, with an intersection C of the crisscross pattern located at the center of the test chart 21. The crisscross intersection C (reference pattern) drawn on this test chart 21 gives a positional reference point with respect to the shooting direction of a test sample and represents the shooting direction to aim in. It is therefore important to place the test chart 21 exactly at the predefined position. Referring to FIG. 7, the test chart 21 is disposed at a distance Z1 from the center of front wheels in the vehicle's longitudinal direction (Z-axis), such that the crisscross intersection C is located at a height Y1 from the ground in the vehicle's height direction (Y-axis) and the flat surface of the test chart 21 becomes parallel to the vehicle's lateral direction (X-axis). The line of sight R of the main camera 2a is set such that it becomes parallel to the Z-axis in a Z-Y plane. If the shooting direction of the main camera 2a is exactly set, the crisscross intersection C, or the reference pattern, is shown at a specific position on the reference image.

When the examiner enters a command to start examination by operating the test unit 18, the microcomputer 9 (i.e., the testing section 13) first performs system initialization in step 1 and, then, samples a reference image for one complete frame (step 2). Specifically, the testing section 13 gives a signal read instruction to the selector 14 at first. The selector 14 outputs only the analog reference image signal to the superimposing section 15 according to this instruction. Examination of the shooting directions of the stereo camera apparatus 1 is conducted based only on the reference image obtained from the main camera 2a. The examination to be performed here is intended to evaluate the shooting directions of the stereo camera apparatus 1 with a relatively coarse degree of accuracy, and is not intended to evaluate minor deviations of the lines of sight L, R of both the left and right cameras 2a, 2b. Taking into consideration the degree of accuracy required in this examination, no problem is expected to arise even when the evaluation is made based on the reference image alone.

Figure 9:
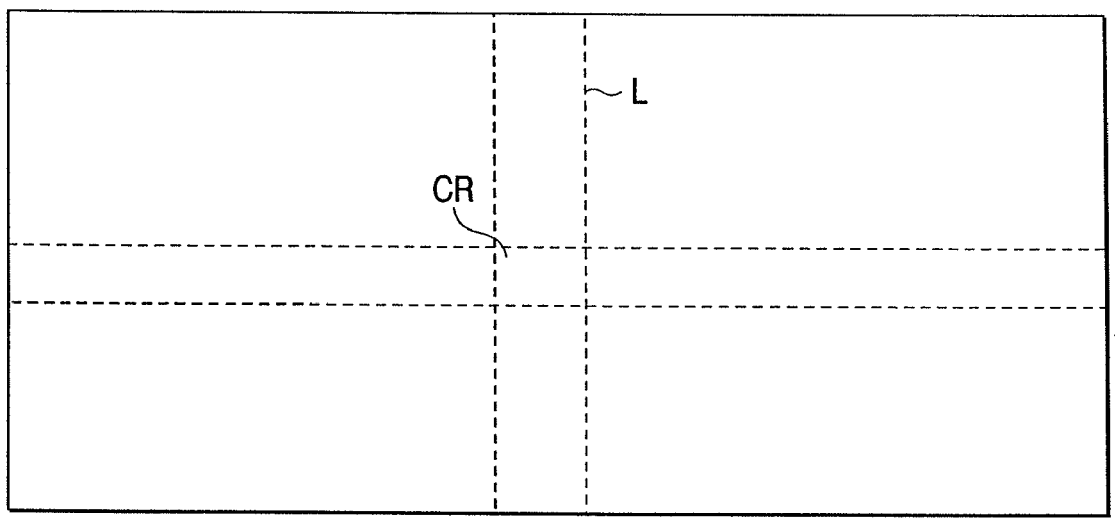
FIG. 9 is an explanatory diagram showing operation for superimposing judgment reference lines on a reference image.

In step 3 which follows step 2, the superimposing section 15 performs the superimposition operation on the analog reference image signal for one frame to superimpose the judgment reference lines L on the reference image. FIG. 9 is a diagram for explaining the operation for superimposing the judgment reference lines L on the reference image. As shown in this Figure, the judgment reference lines L are fixedly set at a specific position in an image area, with two each lines L extending in horizontal and vertical directions. Superimposition of the horizontally extending judgment reference lines L is achieved by setting a horizontal scanning line corresponding to the position (j-coordinate) of each judgment reference line L to the brightness level of that judgment reference line L. Also, superimposition of the vertically extending judgment reference lines L is achieved by setting the signal level at the position (i-coordinate) of each judgment reference line L on individual horizontal scanning lines to the brightness level of that judgment reference line L. A judgment pattern CR enclosed by the four judgment reference lines L is created at a central part of the reference image area by performing the aforementioned superimposition operation. This judgment pattern CR indicates the actual shooting direction of the test sample. The size of this judgment pattern CR is determined according to the degree of accuracy required for the examination. Specifically, if it is desired make a very exact judgment on compliance or non-compliance of the camera shooting direction, the judgment pattern CR should be set to a small area.

Figure 10:
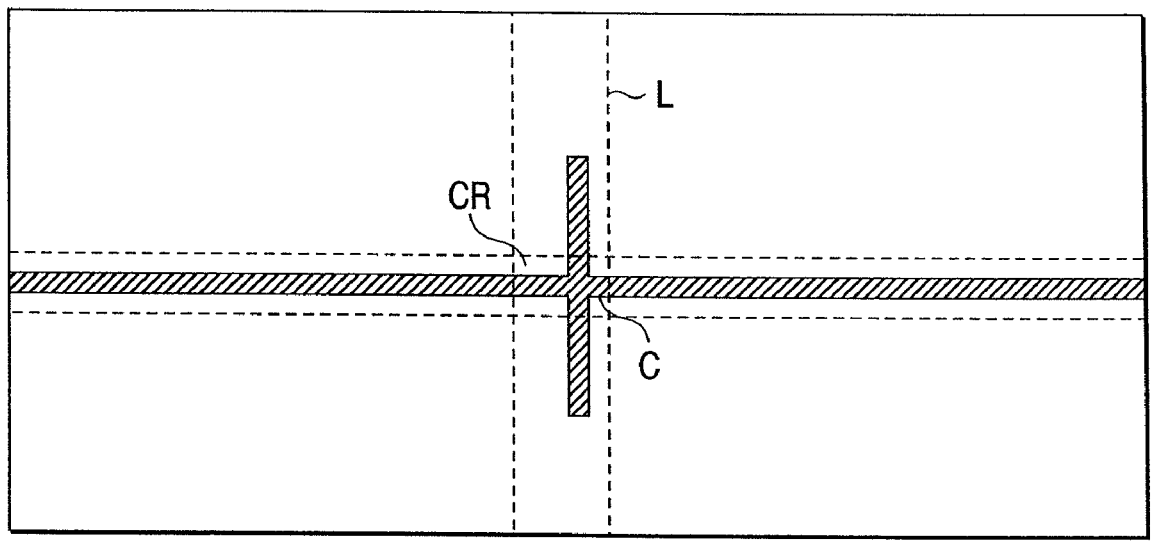
FIG. 10 is an example of an on-screen reference image overlaid with a judgment pattern.

In succeeding step 4, a photographed image is presented on the navigation display 17 which constitutes the navigation unit 16 based on the analog reference image signal which has been subjected to the superimposition operation. FIG. 10 is an example of an on-screen reference image overlaid with the judgment pattern CR. The examiner makes a judgment on compliance or non-compliance of the shooting direction by visually verifying the relationship between the position of the crisscross intersection C (reference pattern) on the on-screen image and the position of the judgment pattern CR enclosed by the four judgment reference lines L. Specifically, if the crisscross intersection C is located inside the judgment pattern CR, the examiner judges that the shooting direction of the test sample is "good." On the contrary, if the crisscross intersection C is located outside the judgment pattern CR, the examiner judges that the shooting direction of the test sample is "improper." As an example, if the crisscross intersection C is located to the right side of the judgment pattern CR, it indicates that the shooting direction of the stereo camera apparatus 1 is shifted too leftward. Also, if the crisscross intersection C is located to the above the judgment pattern CR, it indicates that the shooting direction of the stereo camera apparatus 1 is shifted too downward. The examiner judges the compliance or non-compliance of the test sample and take steps to readjust the camera mounting position, where necessary, (including later-described replacement of the mounting plate 30).

As seen above, the test chart 21 placed at the predefined position ahead of the vehicle is photographed and the photographed image obtained by the main camera 2a is presented on the navigation display 17 in the test method of the present embodiment. The crisscross intersection C (reference pattern) on the on-screen image indicates the shooting direction to aim in. On the other hand, the judgment pattern CR enclosed by the four judgment reference lines L indicates the actual shooting direction of the test sample and the area of the judgment pattern CR indicates a range which is judged to be proper in this examination. It is therefore possible to make a judgment on compliance or non-compliance of the shooting direction of the test sample by comparing the position of the crisscross intersection C and the position of the judgment pattern CR.

Consequently, the examiner can efficiently make a judgment on compliance or non-compliance of the shooting direction of the test sample by just visually inspecting the on-screen image. Also, since the proper range of the shooting direction is displayed, it is possible to prevent the occurrence of a situation in which variations occur in test results due to individual differences among examiners, enabling more objective examination.

Furthermore, the photographed image is presented on the navigation display 17 provided in the navigation unit 16 in this embodiment. Accordingly, it is not necessary to prepare a special display device for the examination. For this reason, good working space can be secured and, as a consequence, it is possible to further improve the efficiency of the examination.

While the example using a test chart carrying the crisscross pattern has been described in the foregoing embodiment, the test chart is not limited to this example. It is possible to use test charts carrying various other brightness patterns.

Figure 11:
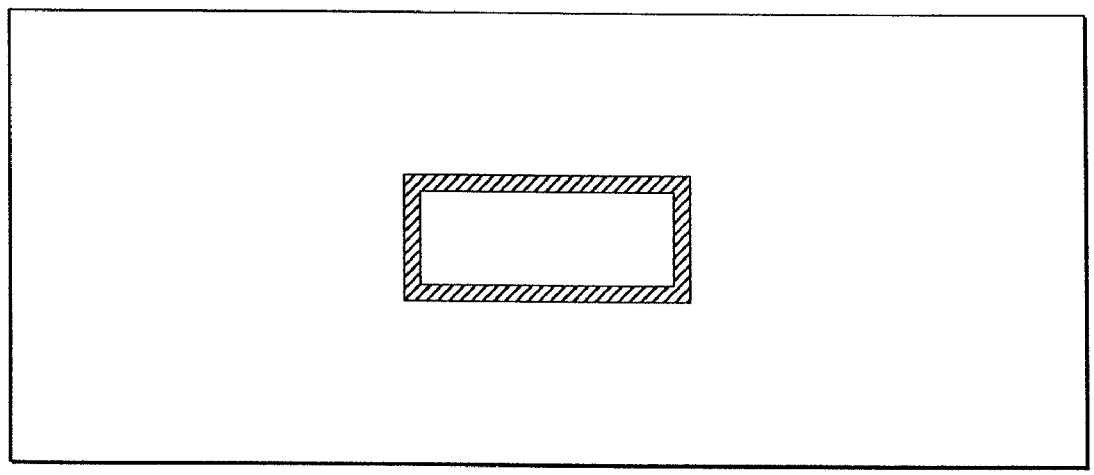
FIG. 11 is a diagram showing another example of the test chart.
Figure 12:
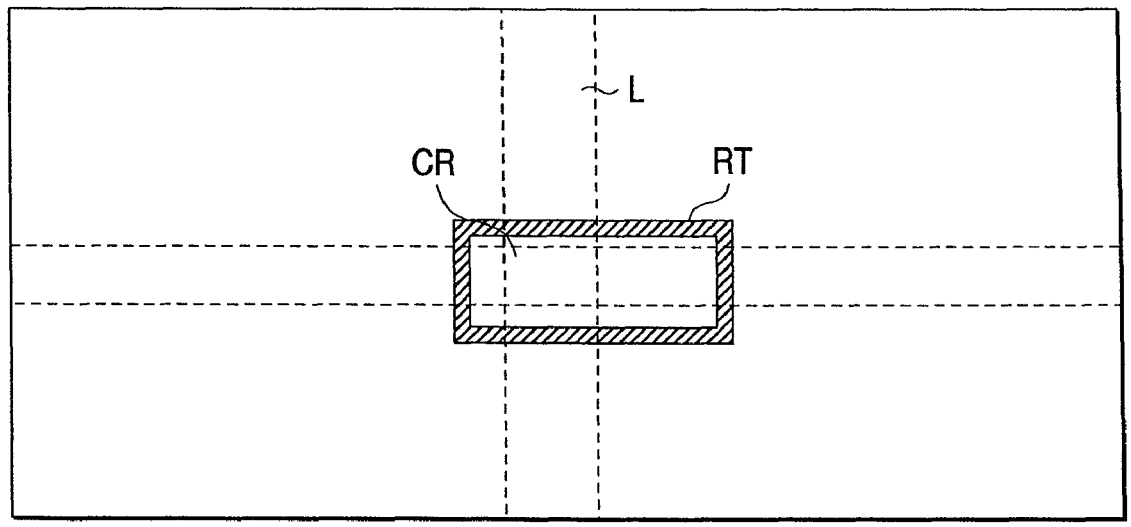
FIG. 12 is another display example of the reference image overlaid with a judgment pattern.

For example, FIG. 11 is a diagram showing another example of a brightness pattern of the test chart, in which a rectangle of a specific size is drawn in black lines on a white surface of the test chart. Shown in FIG. 12 is a display example of the reference image overlaid with the judgment reference lines L in the case of this test chart. The examiner makes a judgment on compliance or non-compliance of the test sample by comparing the position of the rectangle RT (which defines a proper range) shown on an on-screen photographed image and the position of the judgment pattern CR enclosed by the four judgment reference lines L. Specifically, if the judgment pattern CR is located inside the rectangular reference pattern RT, the examiner judges that the test sample is "good." On the contrary, if the judgment pattern CR deviates from the range of the reference pattern RT, the examiner judges that the test sample is "improper." While test methods using the test chart carrying the crisscross reference pattern shown in FIG. 8 are discussed in second and third embodiments to be described later, it is of course possible to use the test chart carrying the rectangular reference pattern shown in FIG. 11.

The foregoing discussion has dealt with a case in which two each judgment reference lines L extend in horizontal and vertical directions. It is however possible to test the shooting direction of the stereo camera apparatus 1 if there is at least one each judgment reference line L extending in the horizontal and vertical directions. As an example, in FIG. 10, horizontal and vertical judgment reference lines L are set at positions where they match the crisscross reference pattern under conditions where deviations in the shooting direction do not exist at all. If the judgment reference line L extending in the vertical direction does not match the vertical line of the crisscross pattern, it means that there is a deviation of horizontal shooting directions. Also, if the judgment reference line L extending in the horizontal direction does not match the horizontal line of the crisscross pattern, it means that there is a deviation of vertical shooting directions.

Second Embodiment

Figure 2:
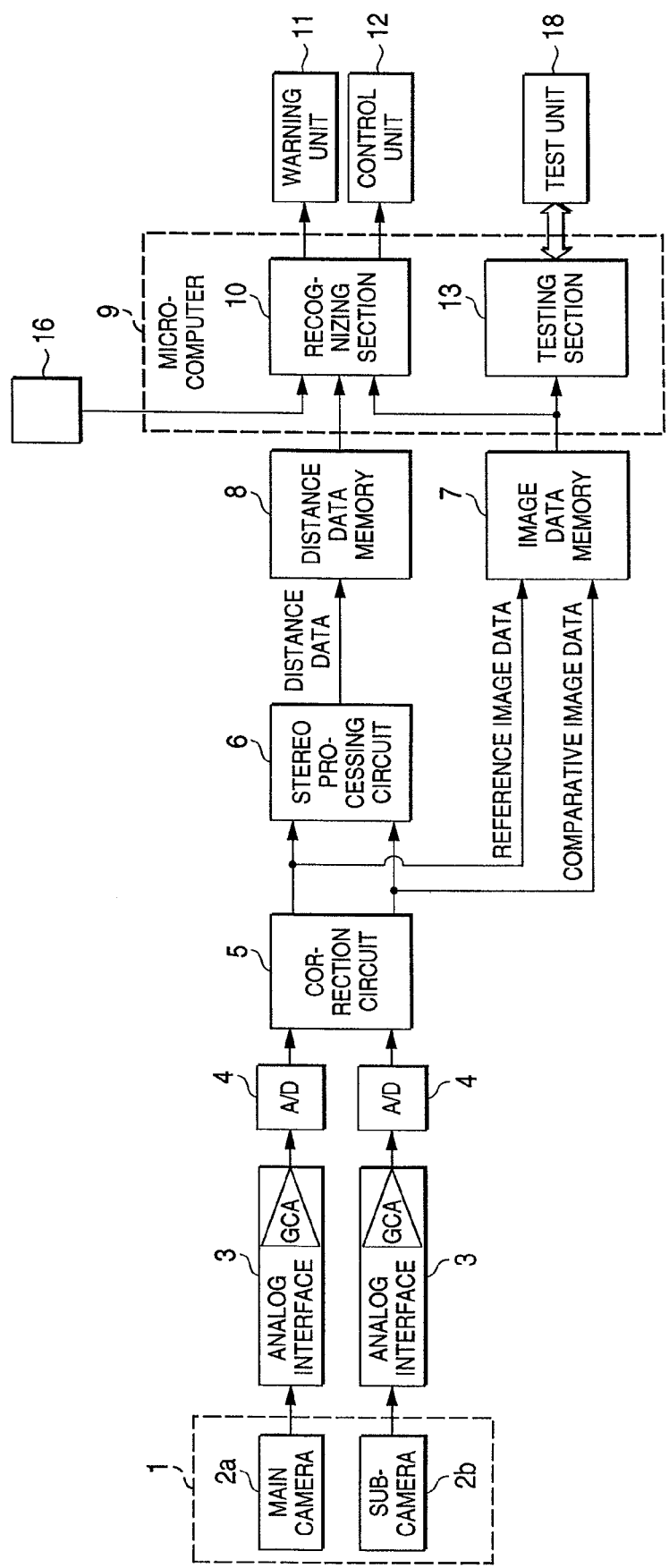
FIG. 2 is a block diagram of a stereoscopic outside view monitoring system according to second and third embodiment.

FIG. 2 is a block diagram of a stereoscopic outside view monitoring system according to the second embodiment. A characteristic feature of a test method of this embodiment lies in that a judgment on compliance or non-compliance of the shooting direction of a test sample is made automatically by the microcomputer 9 instead of by visual inspection by the examiner (first embodiment). Since the analog controller 19 and the navigation display 17 of FIG. 1 are not directly related to the following description of the present embodiment, they are omitted in FIG. 2. An example using these devices 17, 19 will be later described. Since the other constituent elements are identical to those of the first embodiment, they are designated by the same numerals and their description is omitted here.

Figure 4:
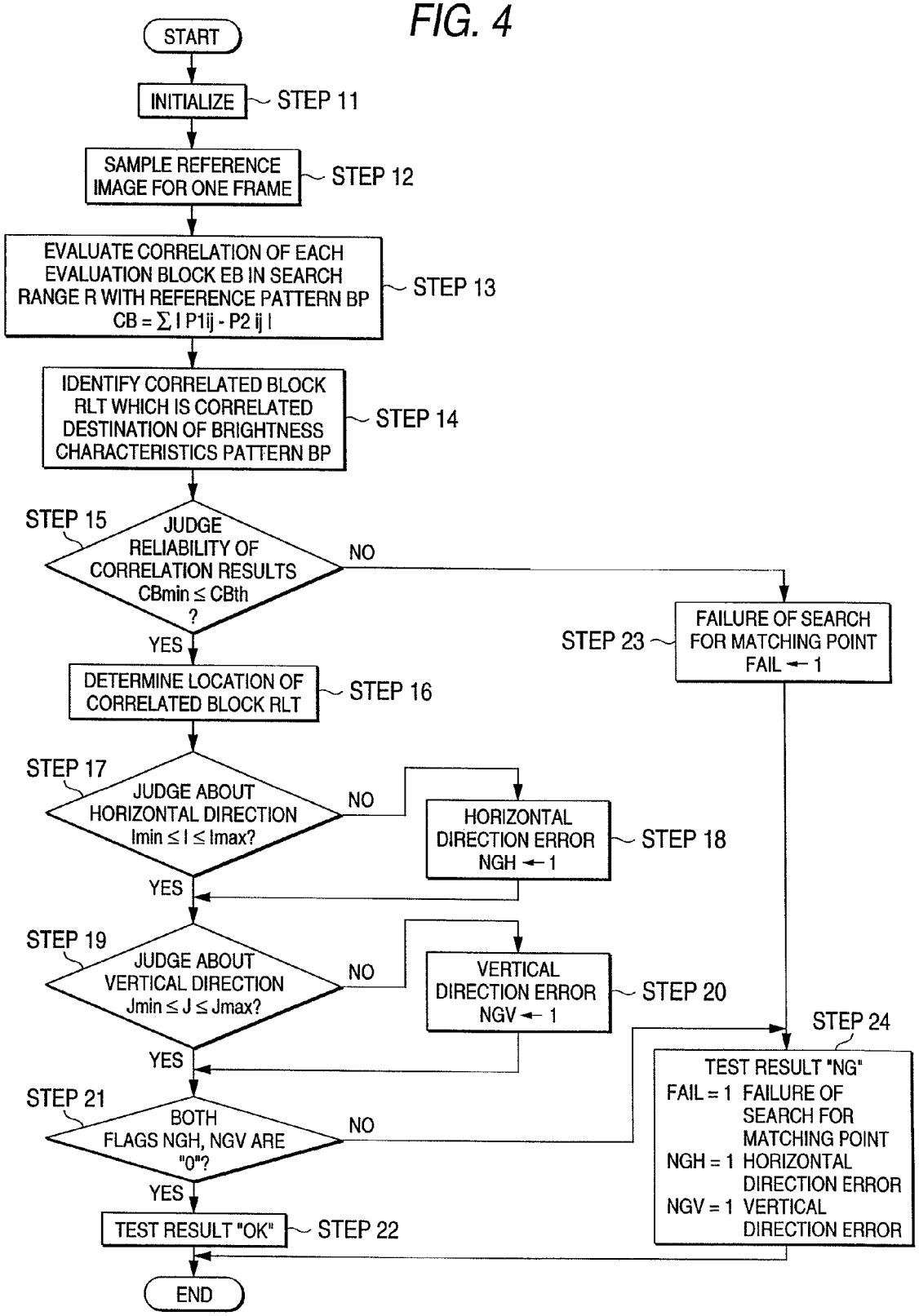
FIG. 4 is a flowchart showing a procedure for examining shooting directions of a stereo camera apparatus according to the second embodiment.

FIG. 4 is a flowchart showing a procedure for examining shooting directions of a stereo camera apparatus according to the second embodiment. With the test chart 21 shown in FIG. 8 placed at a specified position ahead of the vehicle (see FIG. 7), the examiner enters a command to start an examination routine from the test unit 18 to the testing section 13. When the examination routine has been initiated, the testing section 13 first performs system initialization (step 11) and samples a reference image for one complete frame (step 12). Image data to be subjected to the examination is digital reference image data stored in the image data memory 7 after undergoing data processing operation similar to ordinary monitoring control operation.

Figure 13:
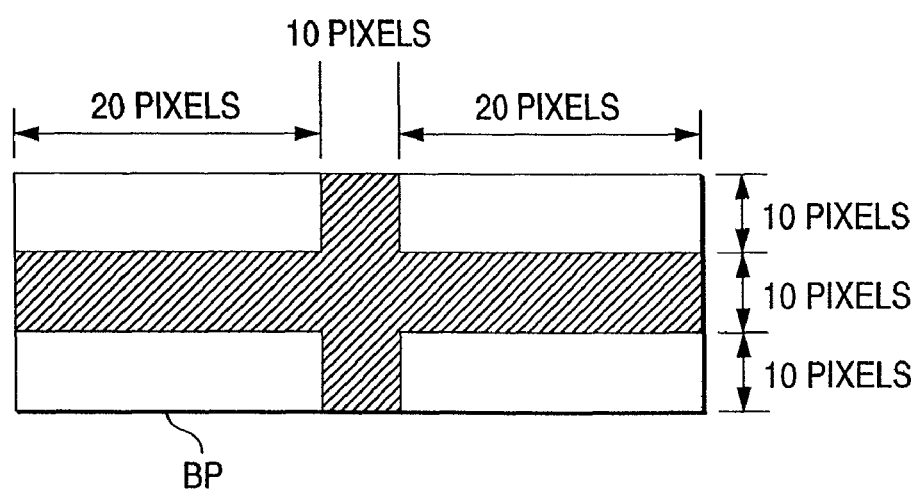
FIG. 13 is a diagram showing a reference pattern.

Next, correlation of each individual evaluation block EB existing within a search range R set in the reference image with a brightness characteristics pattern BP previously stored in a read-only memory (ROM) in the microcomputer 9 is evaluated (step 13). FIG. 13 is a diagram showing the brightness characteristics pattern BP. The brightness characteristics pattern BP is a rectangular area of 50 pixels in the horizontal direction by 30 pixels in the vertical direction. This pattern BP has the same brightness characteristics as the crisscross intersecting part (reference pattern) of the test chart 21. The width of a low-brightness portion (which corresponds to crisscross black lines) is set such that it becomes equal to the width of lines shown on a photographed image when the test chart 21 placed at the position depicted in FIG. 7 is photographed. In this embodiment, the width of the low-brightness portion is made equal to 10 pixels taking into consideration the distance Z1 from the vehicle 22 to the test chart 21.

Figure 14:
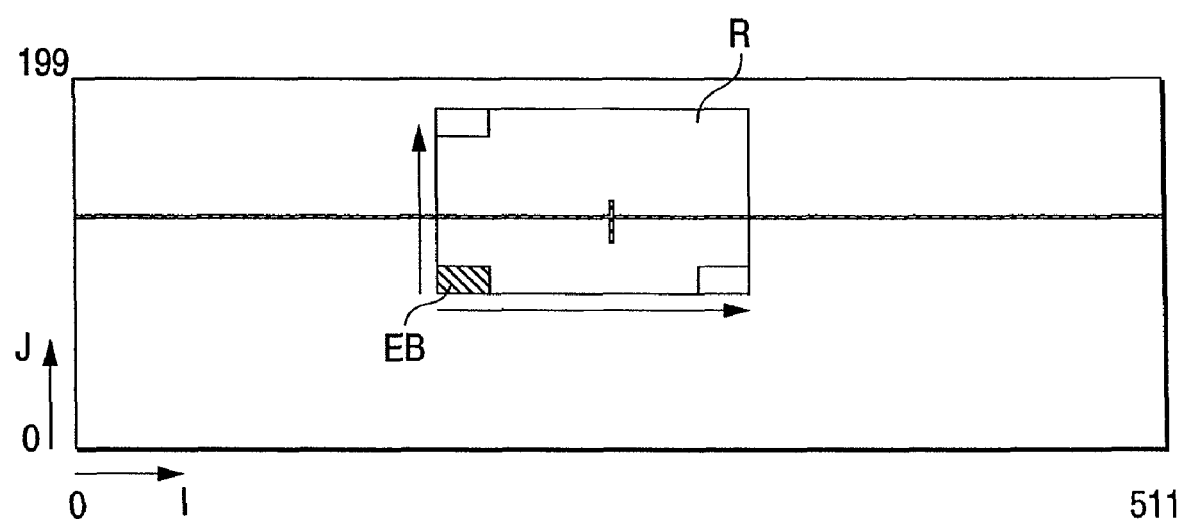
FIG. 14 is a diagram showing a search range within a reference image area.

FIG. 14 is a diagram showing the search range R within the reference image area. The search range R is set in relation to an ideal position of the crisscross intersection C presented on the reference image (or the position where deviations in the shooting direction do not exist at all). The area of the search range R is made much larger than the range of deviation of the crisscross intersection C which could occur due to an error in the mounting position of the stereo camera apparatus 1. Search is carried out to find a correlated destination of the brightness characteristics pattern BP, or the position where the crisscross intersection C which is the reference pattern is shown, by performing a two-dimensional matching operation within this search range R. The correlation with the brightness characteristics pattern BP is evaluated for each 50×30-pixel region (which has the same shape and area as the brightness characteristics pattern BP) in the search range R. This unit region to be searched at one time is hereinafter referred to as the "evaluation block EB."

The correlation between the brightness characteristics pattern BP and each evaluation block EB can be evaluated by calculating city block distance CB shown in equation 1, for instance. In this equation, p1$ij$ represents a factor (brightness value) of pixel (i, j) of the brightness characteristics pattern BP, while p2$ij$ represents a factor (brightness value) of pixel (i, j) of the evaluation block EB. The city block distance CB is the sum (absolute value) of differences between the two geographically corresponding brightness values p1$ij$, p2$ij$ for one complete pixel block, wherein the smaller the differences, the greater the correlation between the two pixel blocks.

$$CB = \Sigma |p1ij - p2ij| \quad \text{(Equation 1)}$$

While shifting the subject of comparison pixel by pixel in the horizontal and vertical directions (two-dimensional matching operation), the city block distance CB is calculated for each successive evaluation block EB.

In step 14 which follows step 13, a correlated block RLT which is the correlated destination of the brightness characteristics pattern BP is identified. The correlated block RLT is the evaluation block EB whose city block distance CB is at a minimum (or which has been evaluated to have the greatest correlation).

Then, in step 15, the reliability of correlation results is judged by comparing the city block distance (minimum city block distance) CBmin and a specific judgment threshold value CBth. For example, under conditions where the crisscross intersection C is not shown within the search range R, even if the correlated block RLT has been identified in step 14, its city block distance CBmin is large. Thus, if the threshold value CBth is set to a proper value which will not be exceeded under conditions where the crisscross intersection C is shown within the search range R, it is possible to judge the reliability of the correlation results. If the judgment result in step 15 is in the negative, or if the minimum city block distance CBmin is larger than the judgment threshold value CBth, it is judged that the reliability of the correlation results is low and the operation flow proceeds to step 23. In this case, fail flag FAIL is set to "1" (failure of search for a matching point of the crisscross intersection). If the position of the crisscross intersection C is not known, it is impossible to identify a target (positional reference point) for the shooting direction. Therefore, the test result becomes "NG" (step 24). Upon receiving the test result in the testing section 13, the test unit 18 notifies the examiner that the test result is "no good." Since the fail flag FAIL is set to "1," the test unit 18 also notifies that the unsuccessful result is due to the failure of search for a matching point.

On the contrary, if the judgment result in step 15 is in the affirmative, it is judged that the correlation results are reliable and the operation flow proceeds to a procedure of step 16 and onward. First, the location of the correlated block RLT in the reference image is determined in step 16. The location of the correlated block RLT is indicated by its lower left coordinates (i, j). The position of the correlated block RLT identified as the correlated destination of the brightness characteristics pattern BP corresponds to the position of the crisscross intersection C presented on-screen.

In step 17 which follows step 16, a judgment is made concerning a deviation of a horizontal component of the shooting direction. Specifically, if i-coordiante value I of the correlated block RLT lies within a proper range defined by a lower limit value Imin and an upper limit value Imax, the test sample is judged to be "good" with respect to the horizontal direction. In this case, the operation flow proceeds directly to step 19 without going through step 18. On the contrary, if the i-coordiante value I deviates from this proper range, it is judged that there is a shooting error in the horizontal direction. In this case, the operation flow proceeds to step 18, where a horizontal direction error flag NGH is set to "1" and the operation flow proceeds to step 19. Since this error flag NGH is initially set to "0," it remains to be "0" when the horizontal component of the shooting direction lies within the proper range.

In succeeding step 19, a judgment is made concerning a deviation of the vertical component of the shooting direction. Specifically, if j-coordinate value J of the correlated block RLT lies within a proper range defined by a lower limit value Jmin and an upper limit value Jmax, the test sample is judged to be "good" with respect to the vertical direction. In this case, the operation flow proceeds directly to step 21 without going through step 20. On the contrary, if the j-coordinate value J deviates from this proper range, it is judged that there is a shooting error in the vertical direction. In this case, the operation flow proceeds to step 20, where a vertical direction error flag NGV is set to "1" and the operation flow proceeds to step 21. Since this error flag NGV is initially set to "0," it remains to be "0" when the vertical component of the shooting direction lies within the proper range.

In step 21, a judgment is made as to whether both the horizontal direction error flag NGH and the vertical direction error flag NGV are set to "1". If both flags NGH, NGV are "0," the test result is "OK" (step 22). In this case, the test unit 18 notifies the examiner that the test result is "good" upon receiving the test result in the testing section 13.

Contrary to this, when either of the flags NGH, NGV is "1," the test result becomes "NG" (step 24). In this case, the test unit 18 notifies the examiner that the test result is "no good" upon receiving the test result in the testing section 13. In addition to this, if the horizontal direction error flag NGH is set to "1," the test unit 18 also notifies that the shooting direction excessively deviates leftward or rightward. Furthermore, if the vertical direction error flag NGV is set to "1," the test unit 18 also notifies that the shooting direction excessively deviates upward or downward.

In this embodiment, the shooting direction of the test sample is automatically examined by the microcomputer 9, and the examiner can know whether the shooting direction of the test sample is good or not by notification given by the test unit 18. Accordingly, it is not necessary for the examiner to visually examine the photographed image on the navigation display 17 unlike the first embodiment. It is therefore possible to achieve a further increase in the efficiency of the examination and a further improvement in objectivity of the test result.

As a variation of the present embodiment, the navigation display 17 may be used as a display device for the test result. (This is similarly applicable to the third embodiment described below.) In this case, the test result produced by the testing section 13 may be superimposed by the superimposing section 15 using the analog controller 19 in a manner similar to the first embodiment.

Third Embodiment

Figure 5:
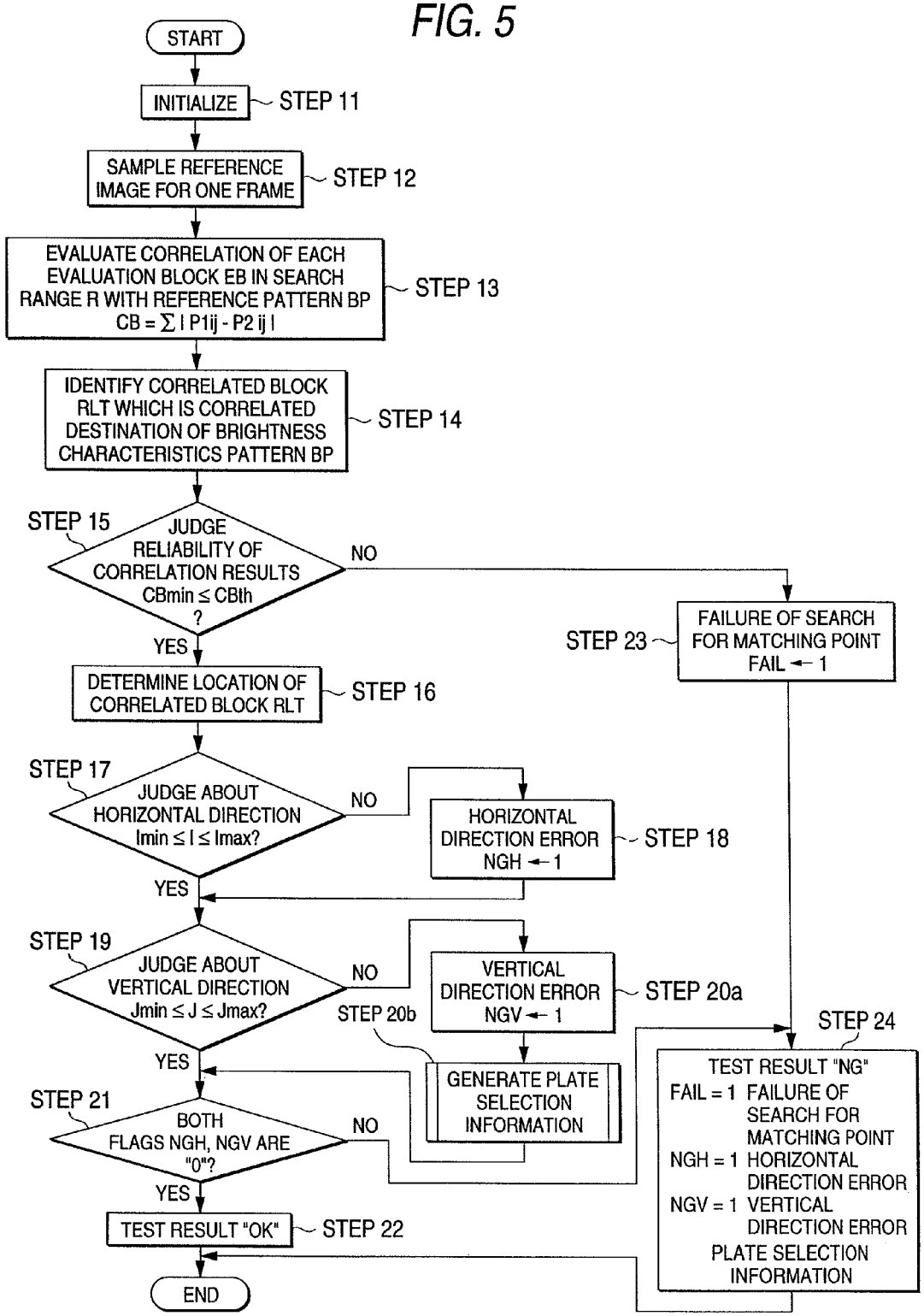
FIG. 5 is a flowchart showing a procedure for examining shooting directions of a stereo camera apparatus according to the third embodiment.

FIG. 5 is a flowchart showing a procedure for examining shooting directions of a stereo camera apparatus according to the third embodiment. A characteristic feature of a test method of this embodiment is that, when the vertical component of the shooting direction deviates, one of the replacement plates A-D shown in FIG. 15 is selected (step 20$b$), following step 20$a$ (same as step 20 of FIG. 4). The examiner is then notified which plate has been selected as adjustment command information (step 24). Among operations shown in FIG. 5, the operations that are same as those of the second embodiment are designated by the same step numbers and their description is omitted here. Also, an examination according to this embodiment can be performed by using the system configuration shown in FIG. 2 like the second embodiment.

FIG. 15 is a diagram showing the shapes in side view of the multiple plates that can be used as the mounting plate 30, in which their tapered shapes are emphasized as illustrated in FIG. 15 to make it easier to recognize their shapes in side view. Although the standard plate STND is depicted as having an even thickness to facilitate recognition of its relationship with the other plates A-D, the standard plate STND also has a tapered shape in actuality. The standard plate STND is commonly used as the mounting plate 30 in the installation process which proceeds the test process. Under such preconditions, four kinds of plates A-D are prepared as replacement plates for the standard plate STND. Although top surfaces of all the plates A-D have the same shape (see FIG. 19), their tapered shapes in side view slightly vary from one plate to another. The plate B has such a tapered shape that the thickness of its rear part is larger than that of its front part. Therefore, replacing the standard plate STND with the plate B causes the stereo camera apparatus 1 to be directed more upward than before (wherein angle θb relative to the standard plate STND is +1.0°, for example).

Also, the plate A has a more inclined tapered shape than the plate B. Therefore, replacing the standard plate STND with the plate A causes the stereo camera apparatus 1 to be directed more upward than using the plate B (θa=+2.0°, for example).

On the other hand, unlike the plates A and B, the plate C has such a tapered shape that the thickness of its front part is larger than that of its rear part. Therefore, replacing the standard plate STND with the plate C causes the stereo camera apparatus 1 to be directed more downward than before (wherein angle θc relative to the standard plate STND is −1.0°, for example).

Further, the plate D has a more inclined tapered shape than the plate C. Therefore, replacing the standard plate STND with the plate D causes the stereo camera apparatus 1 to be directed more downward than using the plate C (θa=−2.0°, for example).

Figure 6:
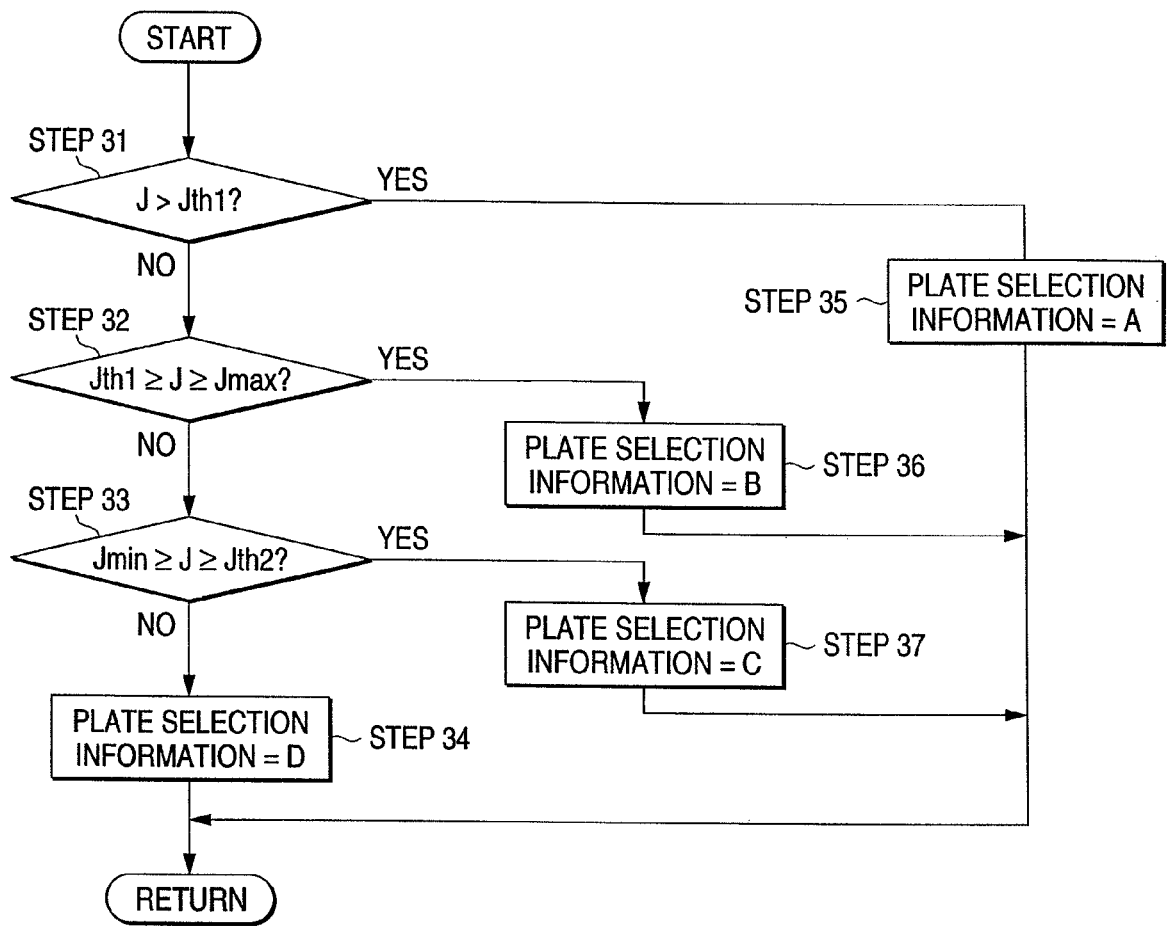
FIG. 6 is a flowchart showing a procedure for generating plate selection information.
Figure 16:
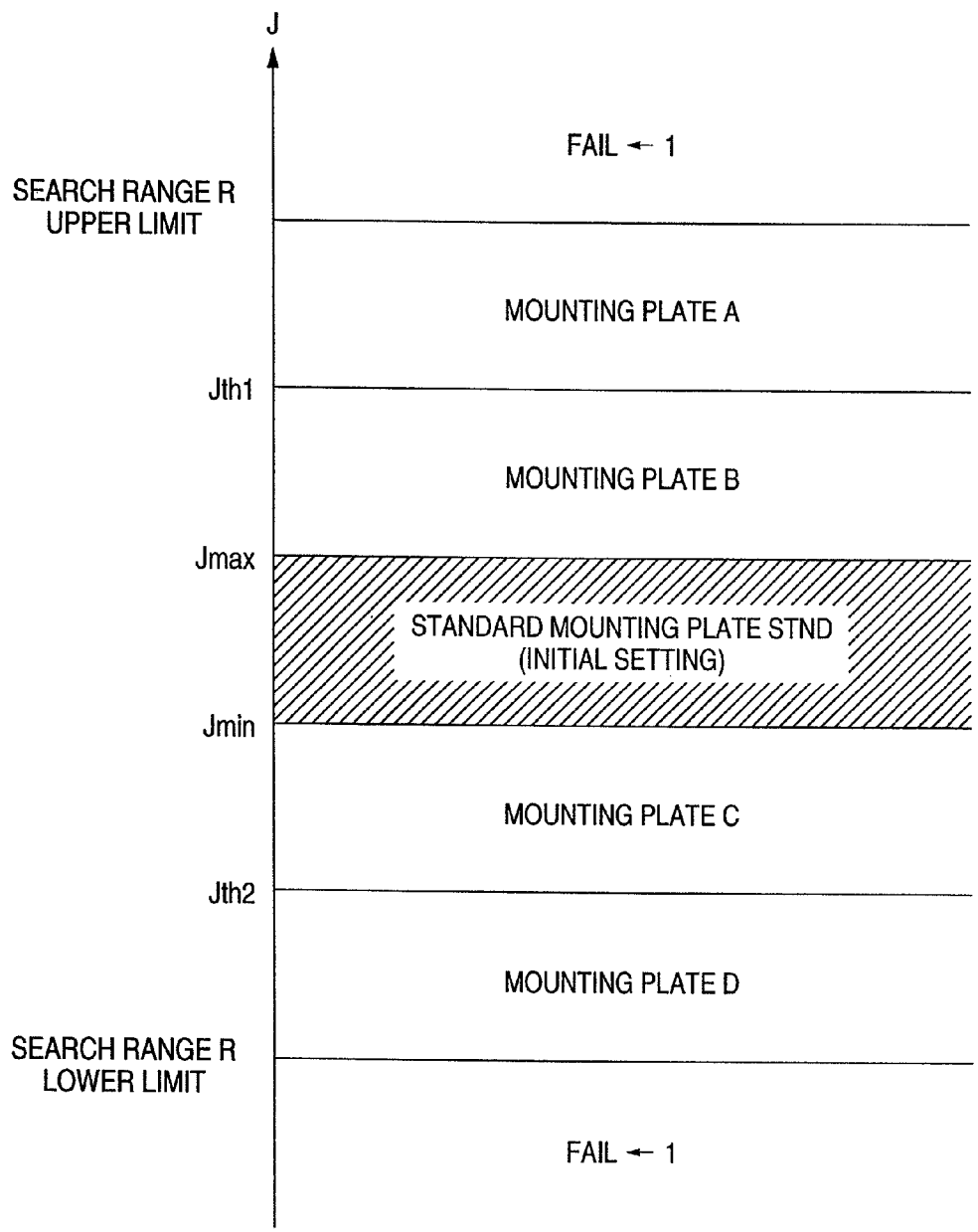
FIG. 16 is a diagram showing a relationship between the amount of deviation of a correlated block in a horizontal direction and the selective plates.

FIG. 6 is a flowchart showing a procedure for generating plate selection information in step 20b, and FIG. 16 is a diagram showing a relationship between the amount of vertical deviation J (hereinafter referred to simply as the "amount of deviation J") of the correlated block RLT and the selective plates A-D. First, a judgment is made in step 31 to determine whether the amount of deviation J is larger than a judgment threshold value Jth1 (>Jmax). If the amount of deviation J is larger than this value Jth1, it is because the stereo camera apparatus 1 is directed fairly downward. Therefore, the operation flow proceeds from an affirmative judgment in step 31 to step 35 in this case, wherein the plate A which gives a large amount of upward correction is selected as selection information for the mounting plate.

On the other hand, if a negative judgment is made in step 31, the operation flow proceeds to step 32, in which a further judgment is made to determine whether the amount of deviation J falls within a range from a judgment threshold value Jth1 to the upper limit value Jmax. If the amount of deviation J falls within this range, it means that the stereo camera apparatus 1 is directed somewhat downward. Therefore, the operation flow proceeds from an affirmative judgment in step 32 to step 36 in this case, wherein the plate B which gives a small amount of upward correction is selected.

If a negative judgment is made in step 32, the operation flow proceeds to step 33, in which a further judgment is made to determine whether the amount of deviation J falls within a range from a judgment threshold value Jth2 to the lower limit value Jmin. If the amount of deviation J falls within this range, it means that the stereo camera apparatus 1 is directed somewhat upward. Therefore, the operation flow proceeds from an affirmative judgment in step 33 to step 37 in this case, wherein the plate C which gives a small amount of downward correction is selected. On the other hand, if a negative judgment is made in step 33, the operation flow proceeds to step 34, in which the plate D which gives a large amount of downward correction is selected.

Since the examination of the shooting direction of the stereo camera apparatus can be conducted automatically by the microcomputer 9 in this embodiment as seen above, it is possible to achieve an increase in the efficiency of the examination as in the case of the second embodiment. Also, if the vertical component of the shooting direction deviates from the proper range, one of the previously prepared replacement plates A-D is selected according to the degree of deviation and the examiner is notified of the relevant selection information. Therefore, it is possible to achieve a great improvement in labor efficiency by making effective use of this selection information when readjusting the mounting position of the stereo camera apparatus. There may be made an arrangement to notify the examiner of information (such as the amount of deviation of the mounting position or the amount of deviation of the shooting direction) about current mounting conditions of the stereo camera apparatus based on the amount of its deviation. In this case, the examiner who performs readjustment may select the proper plate referring to a selection chart, for example, replace the current plate with the selected plate.

The foregoing discussion has revealed the method of adjusting the vertical component of the shooting direction by means of the mounting plate having a tapered shape in cross section along the vehicle's length. The shape of the mounting plate, however, is not limited thereto. For example, it may have a tapered shape in cross section along the vehicle's width. In this case, it is possible to adjust the rotational position of the camera apparatus by replacing plates of different shapes. Also, the inclination of the mounting plate may be determined by the heights of the three bosses 37 shown in FIG. 19 which are situated at frontal and rearward positions of the vehicle's length. One of the characteristic features of the present invention is that it is made possible to adjust the shooting direction of the camera apparatus by replacing the mounting plate which is formed independently of the camera body with another member having a different shape. Accordingly, while various variations might be devised without departing from the scope of the invention, all of these variations are included in the fields of application of the present invention.

Each of the foregoing embodiments has been described with reference to the case in which the stereo camera apparatus is used as a preview sensor. However, the scope of the present invention is not limited to the stereo camera apparatus, but it is needless to say that the invention is applicable to single-lens cameras as well. In particular, the invention is not limited to the camera apparatus with respect to the above-described structure for mounting the stereo camera apparatus but is widely applicable in the form of structures for mounting onboard monitoring sensors using other physical phenomena, such as millimeter waves and laser-generated waves.

It is preferable that the angle of taper of the mounting plate (or the angle of the taper formed by its top and bottom surfaces) be set to a value which will not make a contact surface between the mounting plate and the camera apparatus match the horizontal plane under conditions where the camera apparatus has been mounted. If the contact surface is inclined relative to the horizontal plane, a resisting force occurs at the contact surface against acceleration in the longitudinal direction which occurs in driving situations. It is therefore possible to prevent displacement of the camera apparatus due to such acceleration or its positional deviation with the lapse of time and further improve the reliability of the outside view monitoring system.

Since a judgment on compliance or non-compliance of shooting directions of an onboard camera apparatus can be easily made as seen above according to the present invention, it is possible to achieve a significant improvement in the efficiency of a testing process. Also, it is possible to achieve improved efficiency of readjustment process by providing a worker with information on the amount of deviation (including information on the selection replacement plates) when the shooting direction of a test sample has been judged to be deviating.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A structure for mounting an onboard sensor, comprising:
   a sensor for monitoring traffic conditions ahead of a vehicle;
   a sensor assembly for assembling said sensor; and
   a mounting member formed independently of said sensor assembly,
   wherein said sensor assembly is attached to a vehicle body via said mounting member, and a monitoring direction of said sensor is determined based on the shape of said mounting member and is adjusted by replacing said mounting member with another mounting member having a different shape.

2. The structure for mounting the onboard sensor according to claim 1, wherein said mounting member is a plate-like member and the monitoring direction of said sensor is determined by a state of the thickness of said mounting member.

3. The structure for mounting the onboard sensor according to claim 2, wherein said mounting member has a tapered shape in cross section along a longitudinal direction of the vehicle, and the vertical component of the monitoring direction of said sensor is determined by said tapered shape.

4. The structure for mounting the onboard sensor according to claim 1, wherein a contact surface between said mounting member and said sensor assembly disagrees the horizontal plane under conditions where said sensor is attached to the vehicle body.

5. The structure for mounting the onboard sensor according to claim 1, wherein comprising:
   a fixing member for fixing said sensor assembly to the vehicle body;
   wherein said mounting member is independent of said sensor assembly when said fixing member is removed under conditions where said sensor assembly is fixed to the vehicle body.

6. The structure for mounting the onboard sensor according to claim 1, wherein said mounting member is replaced with another mounting member having a slightly different shape; and
   each mounting member is marked with an identification mark indicating features of shape of said mounting member.

7. The structure for mounting the onboard sensor according to claim 6, wherein a location of said identification mark is placed is an externally unascertainable location under conditions where said sensor is attached to the vehicle body.

8. The structure for mounting the onboard sensor according to claim 1, wherein said sensor assembly is a stereo camera assembly.

9. A structure for mounting an onboard sensor, comprising:
   a mounting member;
   a sensor assembly attached to a vehicle body via said mounting member; and
   a sensor for monitoring traffic conditions ahead of the vehicle, said sensor being assembled into said sensor assembly,
   wherein said mounting member is replaced by removing said sensor assembly, and a monitoring direction of said sensor is determined based on the shape of said mounting member and is adjusted by replacing said mounting member with another mounting member having a different shape.

* * * * *